United States Patent [19]

Bohnhoff

[11] Patent Number: 5,250,340

[45] Date of Patent: * Oct. 5, 1993

[54] MAT FOR STABILIZING PARTICULATE MATERIALS

[76] Inventor: William W. Bohnhoff, 12501 E. Amherst Cir., Aurora, Colo. 80014

[*] Notice: The portion of the term of this patent subsequent to Apr. 7, 2009 has been disclaimed.

[21] Appl. No.: 756,459

[22] Filed: Sep. 9, 1991

Related U.S. Application Data

[63] Continuation-in-part of Ser. No. 575,630, Aug. 31, 1990, Pat. No. 5,102,048, and a continuation-in-part of Ser. No. 588,455, Sep. 26, 1990, Pat. No. 5,123,778.

[51] Int. Cl.$^5$ ............................................. B32B 3/10
[52] U.S. Cl. .................................... 428/99; 428/44; 428/53; 428/131; 404/36; 404/41; 52/180
[58] Field of Search .................. 428/44, 52, 53, 58, 428/99, 131; 404/35, 36, 41; 52/180

[56] References Cited

U.S. PATENT DOCUMENTS

| | | | |
|---|---|---|---|
| 70,076 | 10/1864 | Dean | 404/36 |
| 1,071,091 | 8/1913 | Rogers | 61/38 |
| 1,905,176 | 4/1933 | Kieckhefer | 405/15 |
| 2,315,180 | 3/1943 | Arthur | 405/15 |
| 2,315,448 | 3/1943 | Hagin et al. | 94/4 |
| 2,369,412 | 2/1945 | Ruppel | 94/4 |
| 2,876,628 | 3/1959 | Dixon, Jr. | 61/38 |
| 2,899,775 | 8/1959 | Partin | 47/1 |
| 2,912,910 | 11/1959 | Wilson et al. | 94/13 |
| 3,438,312 | 4/1969 | Becker et al. | 428/53 |
| 3,597,928 | 8/1971 | Pilaar | 61/38 |
| 3,903,702 | 9/1975 | Appleton | 61/37 |
| 3,990,247 | 11/1976 | Palmer | 61/4 |
| 4,008,548 | 2/1977 | Leclerc | 428/44 |
| 4,067,197 | 1/1978 | Ritter | 61/35 |
| 4,111,585 | 9/1978 | Mascaro | 404/70 |
| 4,329,392 | 5/1982 | Bronner | 428/296 |
| 4,610,568 | 9/1986 | Koerner | 405/19 |
| 4,621,942 | 11/1986 | Hill | 404/41 |
| 4,798,498 | 1/1989 | Hallberg | 405/258 |
| 5,102,048 | 4/1992 | Bohnhoff | 239/201 |

FOREIGN PATENT DOCUMENTS

| | | |
|---|---|---|
| 676764 | 12/1947 | Belgium . |
| 1928014 | 12/1970 | Fed. Rep. of Germany . |
| 2410331 | 9/1974 | Fed. Rep. of Germany . |
| 2818793 | 11/1979 | Fed. Rep. of Germany . |
| 45684 | 11/1980 | Japan . |

Primary Examiner—Alexander S. Thomas

[57] ABSTRACT

A mat for stabilizing particulate materials includes a planar quadrilateral grid formed by a plurality of intersecting struts. A reinforcement zone strengthens each of the strut intersections. Upstanding cylindrical tubular members are disposed on the grid in a rectangular array such that the central longitudinal axis of each of the tubular members extends through a strut intersection. Longitudinal ribs are formed on an interior cylindrical sidewall of each of the tubular members and are disposed such that each of the ribs perpendicularly intersects a strut adjacent a bottom end of the tubular member. Sockets are spaced uniformly along two adjacent sides of the mat, with each socket secured between two of the tubular members by a pair of struts. Pins are spaced along the other two adjacent sides of the mat, opposite the sockets, with each pin also secured between two of the tubular members by a pair of struts. The pins are dimensioned for insertion through the sockets, such that a plurality of the mats may be connected in adjacent relation. The free ends of the pins may be deformed after insertion through the sockets to provide permanent securement. The grid, tubular members, pins and sockets are all integrally molded from a semi-rigid thermoplastic material such as high density polyethylene. One or more geotextile layers may be applied to the upper face, the lower face, or both faces of the mat. The mat is intended to stabilize particulate materials such as soil, sand, asphalt, gravel, and may be employed in erosion control and paving applications.

21 Claims, 7 Drawing Sheets

MAT FOR STABILIZING PARTICULATE MATERIALS

RELATED APPLICATIONS

This application is a continuation-in-part of application Ser. No. 07/575,630 filed Aug. 31, 1990 and now U.S. Pat. No. 5,102,048, and application Ser. No. 07/588,455 filed Sept. 26, 1990 and now U.S. Pat. No. 5,123,778, the entire disclosures of both of which are hereby incorporated by reference herein.

BACKGROUND OF THE INVENTION

The present invention relates to a mat for stabilizing particulate materials, for example soil, sand, gravel and asphalt. Such materials are subject to migration and erosion, as well as damage by vehicular and pedestrian traffic. U.S Pat. Nos. 4,067,197 and 4,896,993, the entire disclosures of both of which are incorporated herein by reference, disclose mats directed to the solution of these problems. There has heretofore been considerable difficulty in assembling and transporting mats of size sufficient for use on large areas. Additionally, there is a need for a stabilizing mat which is sufficiently flexible for use on uneven terrain and sufficiently rigid to resist undesired deformation and displacement. Accordingly, the present invention is directed to an improved semi-rigid mat having an integrally molded modular construction which may be easily assembled to cover an area of any particular size and shape for use in erosion control, paving and other applications.

SUMMARY OF THE INVENTION

In order to achieve these and other objects of the invention, the present invention provides an improved mat for stabilizing particulate materials which includes a planar quadrilateral grid formed by a plurality of intersecting struts. A reinforcement zone strengthens each of the strut intersections. Upstanding cylindrical tubular members are disposed on the grid in a rectangular array such that the central longitudinal axis of each of the tubular members extends through a strut intersection. Longitudinal ribs are formed on an interior cylindrical sidewall of each of the tubular members and are disposed such that each of the ribs perpendicularly intersects a strut adjacent a bottom end of the tubular member. Sockets are spaced uniformly along two adjacent sides of the mat, with each socket secured between two of the tubular members by a pair of struts. Pins are spaced along the other two adjacent sides of the mat, opposite the sockets, with each pin also secured between two of the tubular members by a pair of struts. The pins are dimensioned for insertion through the sockets, such that a plurality of the mats may be connected in adjacent relation. The free ends of the pins may be deformed after insertion through the sockets to provide permanent securement. The grid, tubular members, pins and sockets are all integrally molded from a semi-rigid thermoplastic material such a high density polyethylene. One or more geotextile layers may be applied to the upper face, the lower face, or both faces of the mat. The mat is intended to stabilize particulate materials such as soil, sand, asphalt, gravel, and may be employed in erosion control, drainage and paving applications.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
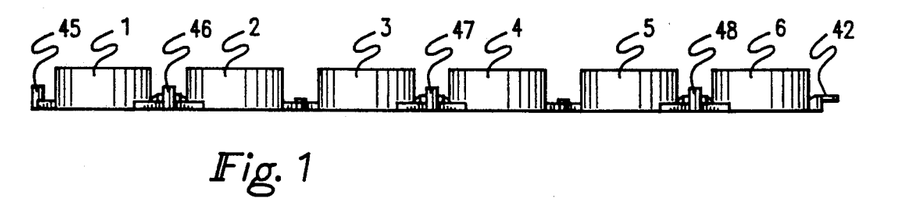
FIG. 1 is a front elevational view of the mat for stabilizing particulate materials according to the first embodiment of the present invention.
Figure 2:
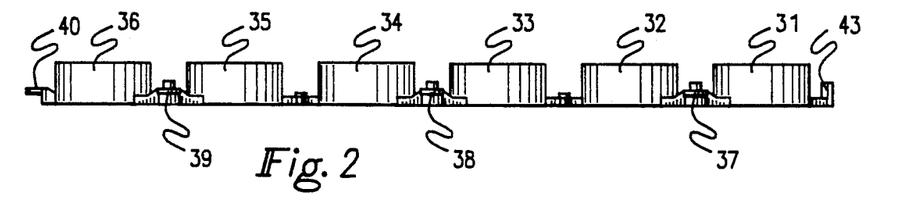
FIG. 2 is a rear elevational view thereof.
Figure 3:
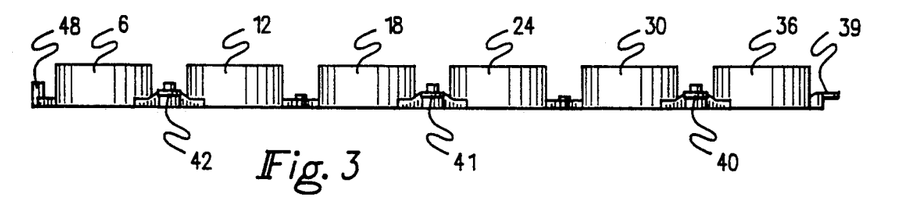
FIG. 3 is a left side elevational view thereof.
Figure 4:
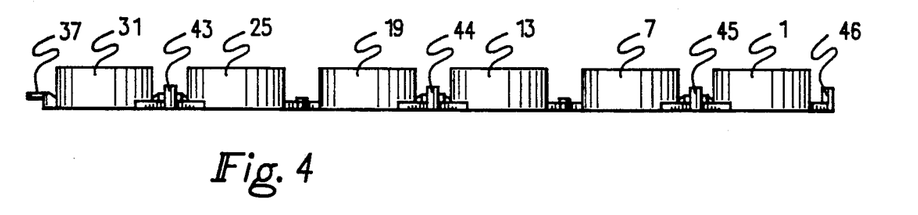
FIG. 4 is a right side elevational view thereof.
Figure 5:
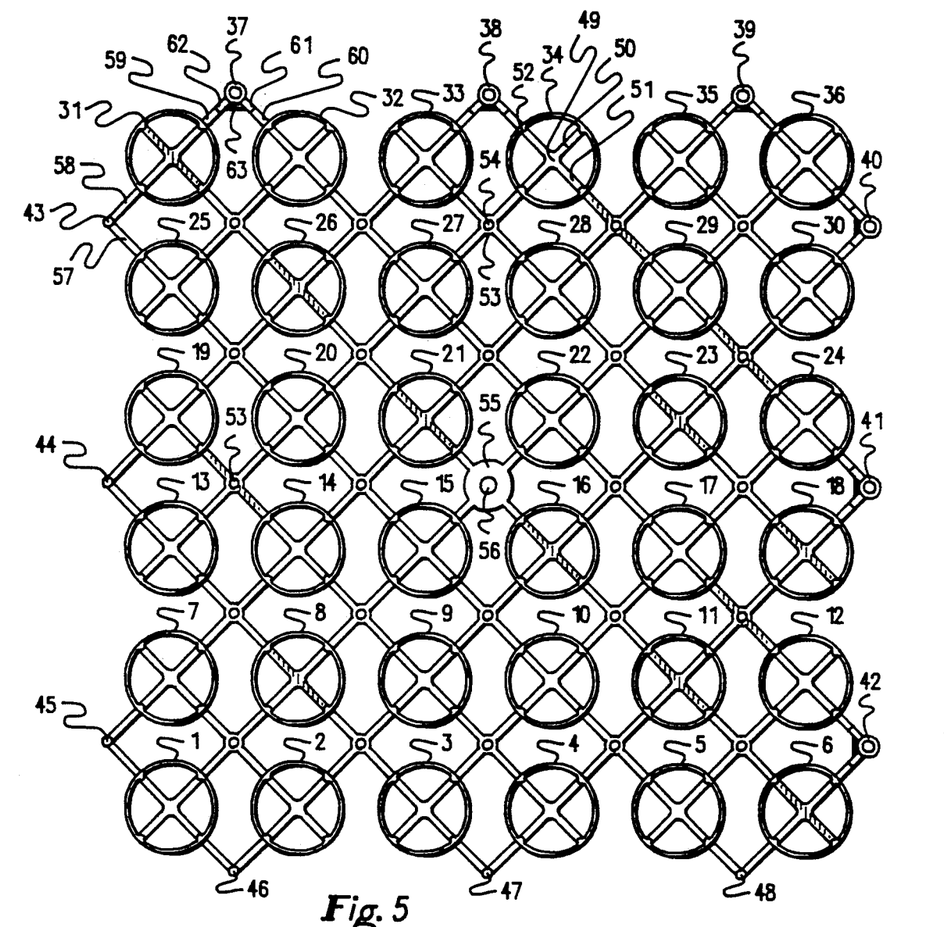
FIG. 5 is a top plan view thereof.

Referring now to the drawings, FIGS. 1-12, wherein like reference numerals designate corresponding structure throughout the views, an improved mat for stabilizing particulate materials according to a first preferred embodiment of the invention includes a plurality of tubular members which, in the illustrated embodiment, take the form of cylindrical rings designated by reference numerals 1 through 36 disposed in a uniform rectangular array defined by a plurality of perpendicular rows and columns. For example, as shown in FIG. 5, tubular members 31, 32, 33, 34, 35, and 36 define the upper-most row, while tubular members 31, 25, 19, 13, 7, and 1 define the left-most column. It should be noted that the use of tubular members of other than cylindrical shape may be employed within the scope of the present invention. For example tubular members having oval, hexagonal, rectangular, square, triangular, octagonal, and other cross-sectional shapes may be utilized. Further, the tubular members may be disposed in non-rectangular arrays, for example in circular patterns, or randomly distributed.

Figure 9:
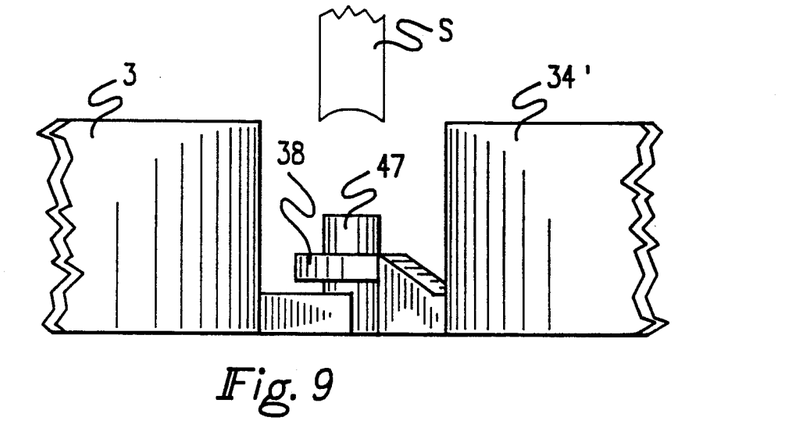
FIG. 9 is a fragmentary elevational view illustrating the joinder of two adjacent mats by a pin and socket connection.
Figure 10:
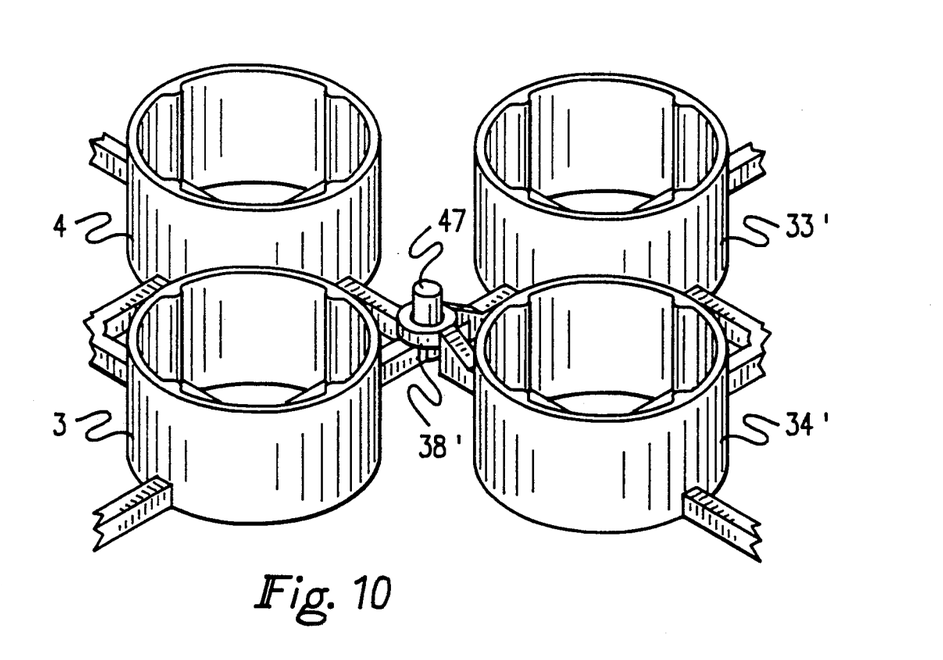
FIG. 10 is a fragmentary top perspective view illustrating the joinder of two adjacent mats by a pin and socket connection.

In order to allow a plurality of the mats according to the present invention to be secured together to form a large mat of any required size and shape, first and second cooperating fasteners are formed on the side edges of the mat. In the illustrated embodiment, the first fasteners take the form of a plurality of sockets, designated by reference numerals 37 through 42, disposed along two adjacent sides of the quadrilateral mat. The second fasteners take the form of pins, designated by reference numerals 43 through 48, spaced along the other two sides of the mat, such that the pins are located opposite the sockets. As shown in FIGS. 9 and 10, two mats may be secured in adjacent relation by inserting the pins spaced along one side edge of one mat through the sockets spaced along a side edge of another mat. For example, the pin 47 disposed between tubular members 3 and 4 of one mat may be inserted through the socket 38' disposed between the tubular members 33' and 34' of another identical mat. The upper ends of the pins, for example pin 47 in FIG. 9, may then be deformed so that the pins may not be withdrawn from the socket. This deformation may be effected by mushrooming the upper end of the pin 47, preferably formed from a thermoplastic material, by heating with a soldering iron S. The soldering iron S may be powered by conventional AC current or 12 VDC current, butane, etc. for field use. Alternatively, other means of securing the pins within the socket may be employed. Suitable securing means include ultrasonic welding, adhesives, etc. While a single mat may be formed of any desired dimensions, it is preferably about 0.5 meters square, such that four mats may be preassembled in a single one square meter unit. These preassembled units may then be stacked and shipped on a standard freight pallet. Alternatively, an elongated strip about five mats wide and fifty feet long may be preassembled and rolled into a large roll adapted to be subsequently shipped and unrolled on site. To more efficiently effect assembly of the mats, a single soldering unit with a plurality of spaced heating heads may be employed to simultaneously deform a large number of pins. The mats may be formed in other than a square shape, for example, oval, circular, rectangular, triangular, hexagonal, octagonal, etc., within the scope of the invention.

The tubular members 1 through 36 are preferably integrally molded with a planar grid formed by a plurality of intersecting perpendicular struts. For example, the tubular member 34 is disposed centrally with respect to an intersection 49 of perpendicular struts 50 and 51. It is contemplated that the struts may be disposed in other than a perpendicular rectangular grid pattern, for example concentric ring struts with intersecting radially extending struts may be employed. Additionally, the struts may be arranged such that the grid openings are circular, oval, triangular, hexagonal, octagonal, etc., within the spirit and scope of the present invention.

Figure 6:
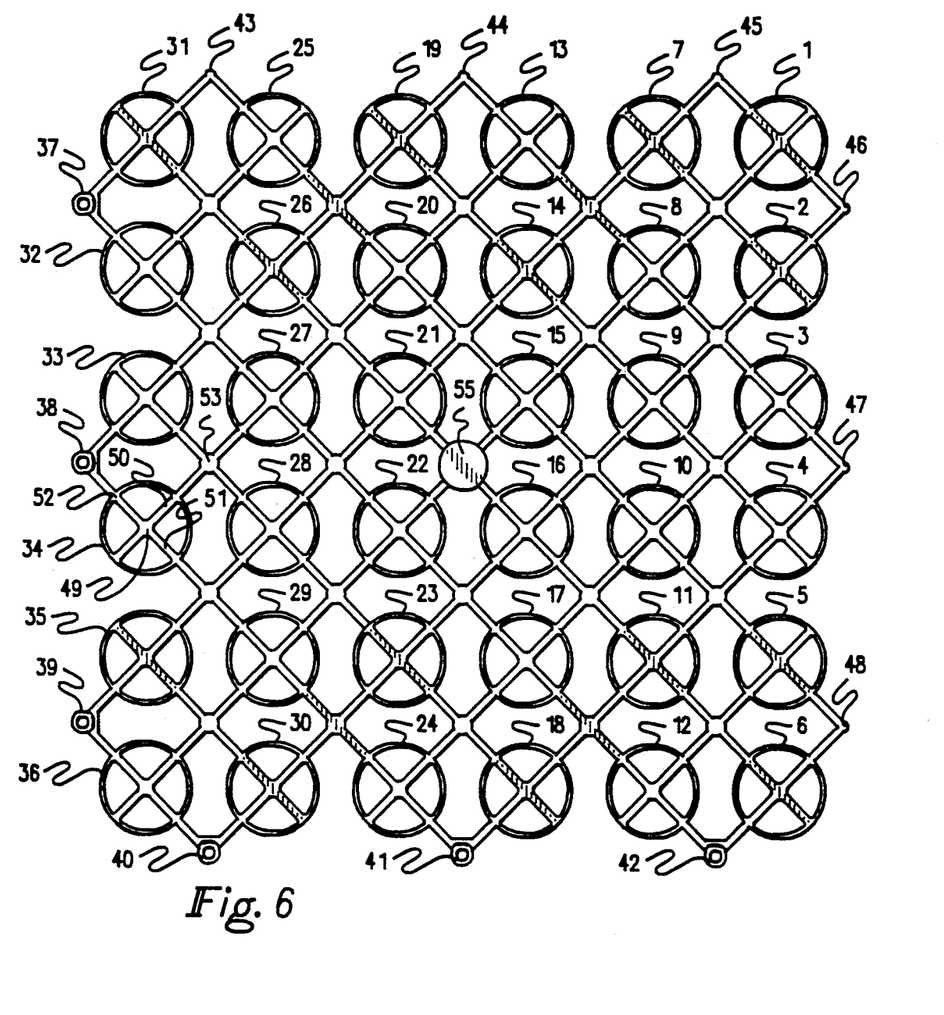
FIG. 6 is a bottom plan view thereof.
Figure 7:
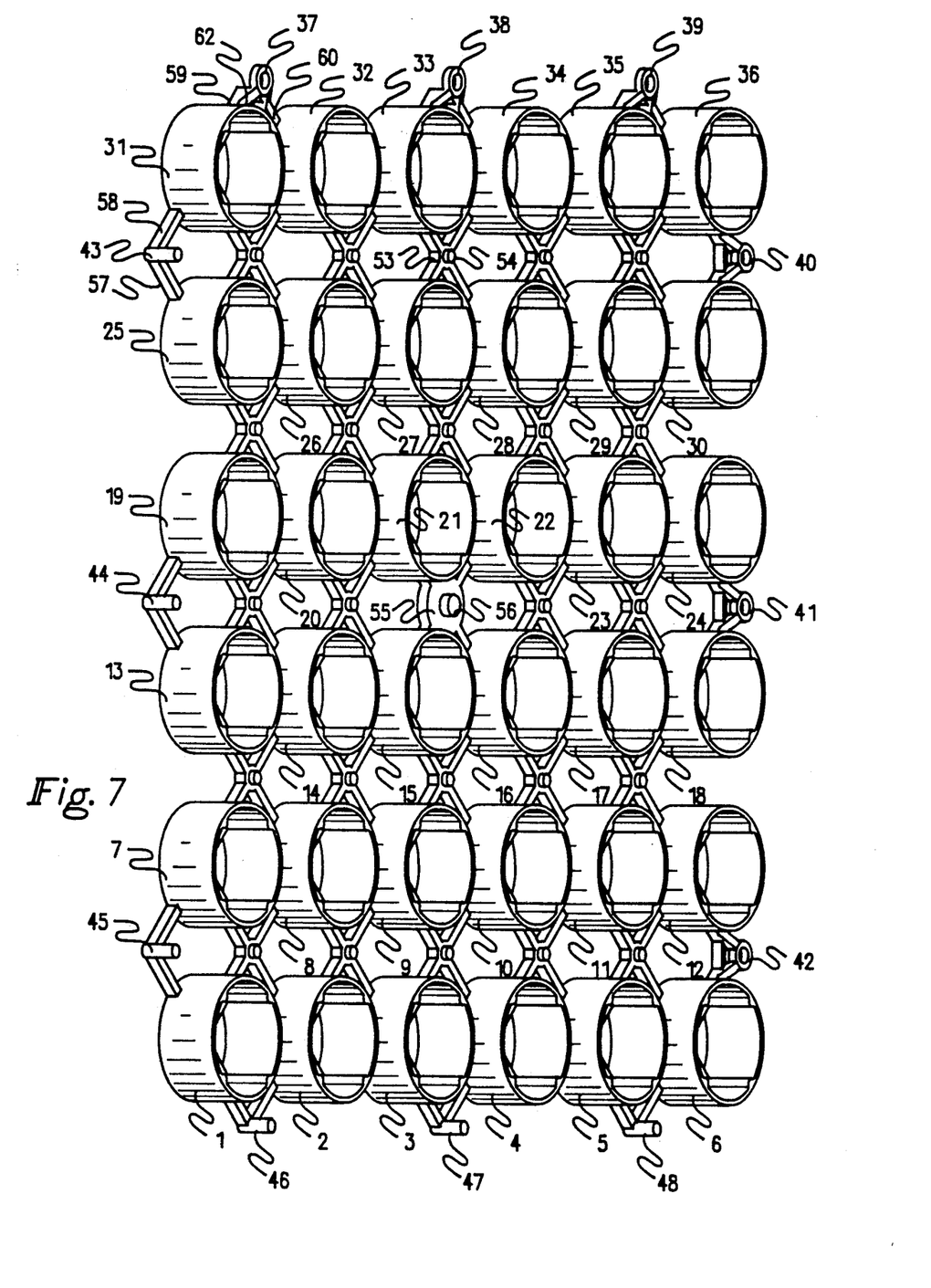
FIG. 7 is a top perspective view thereof.
Figure 8:
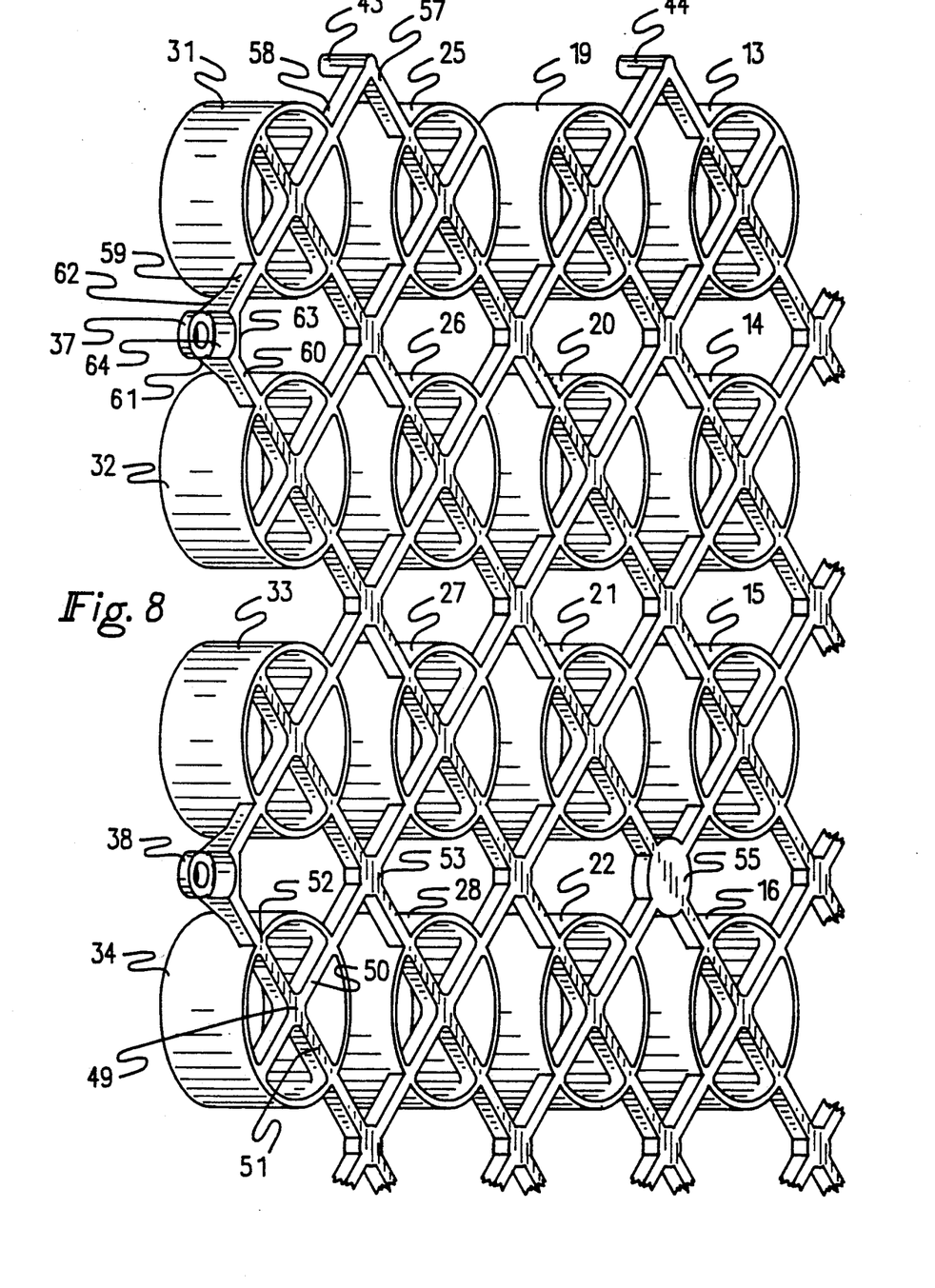
FIG. 8 is a fragmentary bottom perspective view thereof.

In order to add strength and rigidity to the grid and tubular members, a plurality of longitudinal ribs, for example rib 52 of ring 34, extend along internal cylindrical sidewalls of the tubular members such that each of the ribs 52 intersect one of the struts, for example strut 51, adjacent a bottom end of one of the tubular member, as shown in FIGS. 5, 6 and 8. In the illustrated embodiment, each cylindrical tubular member possesses four such longitudinal ribs 52 disposed at ninety degree angular intervals.

Each of the strut intersections, for example the intersection 49 within the tubular member 34 and the external intersection 53, are reinforced by enlarging the dimensions of the zone of intersection with respect to the dimensions of the intersecting struts. The tubular members 1 through 36, sockets 37 through 42, pins 43 through 48 and all of the struts are preferably integrally molded from a semi-rigid thermoplastic material, preferably high density polyethylene, in an injection molding process. Polypropylene is another suitable material. The material selected should provide sufficient rigidity to resist undesired deformation and lateral shifting, but also be sufficiently flexible to allow the mat to be rolled for shipment and also to accommodate uneven terrain. In order to facilitate ejection of the mat from the mold, an upstanding cylindrical boss 54 is formed on each of the external strut intersection zones, for example the intersection 53 disposed adjacent tubular members 33 and 34. A central circular intersection zone 55 is substantially enlarged with respect to the other strut intersection zones and possesses an enlarged upstanding cylindrical boss 56. The zone 55 is the result of an enlargement in the mold to serve as a distribution point for the thermoplastic material during the injection molding process. In this context, the struts serve as sprues or runners which distribute the thermoplastic material throughout the mat structure during the molding process.

Each of the pins, for example pin 43 disposed between tubular members 25 and 31, is secured between two tubular members by a pair of struts 57 and 58. Similarly, each of the sockets, for example socket 37 disposed between tubular members 31 and 32, is secured between two tubular members by a pair of struts 59 and 60. As can be appreciated from FIGS. 2, 3, 7, 8, 9 and 10, each of the sockets, for example socket 37, is secured to struts 59 and 60, by inclined mounting surfaces 62 and 61, respectively. As best shown in FIGS. 5 and 8, a cross brace 63 extends between each of the socket supporting struts 59 and 6 adjacent their intersections with inclined mounting surfaces 62 and 61. As shown in FIG. 8, one side of the brace 63 is formed with an arcuate recess 64 to provide free clearance for insertion of a cooperating pin.

Figure 11:
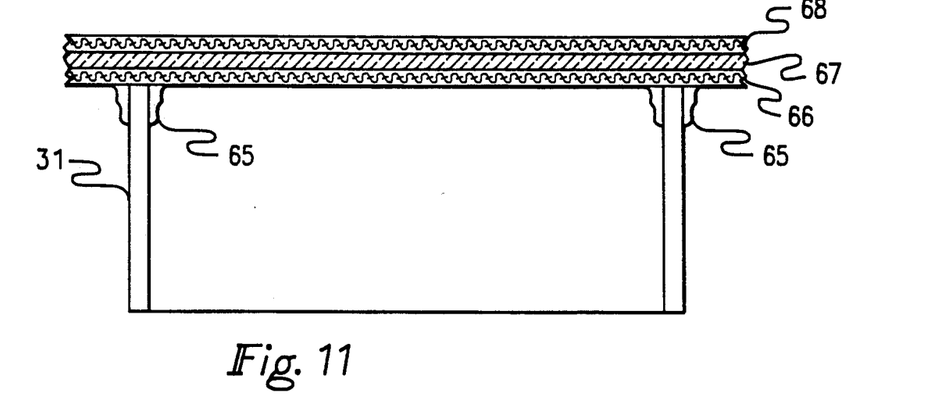
FIG. 11 is a fragmentary side elevational view illustrating a second embodiment of the invention in which one or more geotextile layers are applied to one face of the mat of FIGS. 1-8.

As shown in FIG. 11, one or a plurality of sheet layers 66, 67 and 68 may be secured to or placed over one face of the mat. A suitable adhesive 65 may be employed to effect securement of the sheet layer(s) to the tubular members, for example tubular member 31, and/or to the grid supporting the tubular members. The sheet layers are preferably geotextile materials, and/or geomembranes, and/or skeletal layers in accordance with the disclosure of U.S. Pat. No. 4,896,993. The geotextile sheet(s) may be applied to the bottom surface (grid) of the mat, and the upper ends of the tubular members inserted downwardly into a ground surface for purposes of erosion control. The upper geotextile layer would then provide a stabilized surface for vehicular or pedestrian traffic or establishment and/or protection of vegetation. The grid structure provides additional support for the geotextile sheet, as opposed to the use of tubular members in the absence of the semi-rigid grid, because the struts provide additional supporting contact points.

Figure 12:
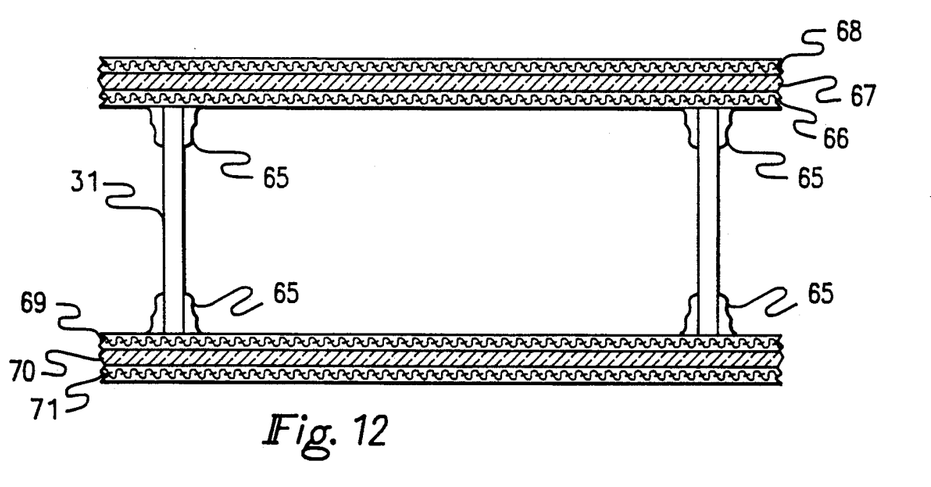
FIG. 12 is a fragmentary side elevational view illustrating a third embodiment of the invention in which one or more geotextile layers are applied to both faces of the mat of FIGS. 1-8.

FIG. 12 illustrates the use of one or more sheet layers 66, 67, and 68 applied to both faces of the mat. This construction results in the formation of voids within and passages between the tubular members, and also in the exclusion of particulate material from the internal structure between the layers. It is contemplated that this embodiment would be utilized in construction applications to form drainage passages, for example on roof decks, in which water would filter through the geotextile materials and be channeled and/or stored within the interior structure.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A mat for stabilizing particulate materials, comprising:
    a substantially planar quadrilateral grid formed by a plurality of intersecting substantially perpendicular struts;
    an enlarged reinforced zone formed at each intersection of said struts;
    a plurality of upstanding substantially cylindrical tubular members spaced uniformly on said grid;
    said tubular members and said grid being semi-rigid and integrally molded from a thermoplastic material;
    said tubular members each having a central longitudinal axis extending through an intersection of said struts forming said grid;
    said tubular members disposed in a substantially uniform rectangular array defined by a plurality of substantially perpendicular rows and columns;
    each adjacent pair of said rows and each adjacent pair of said columns separated by a substantially parallel line formed by intersections of said struts forming said grid;
    said intersections of said struts separating said rows and said columns each having an upstanding substantially cylindrical boss to facilitate ejection of said mat from a mold during manufacture;
    a plurality of longitudinal ribs extending along an inner cylindrical sidewall of each of said tubular members;
    each of said ribs substantially perpendicularly intersecting one of said struts adjacent one end of one of said tubular members;
    a plurality of substantially uniformly spaced sockets disposed in a line along two adjacent sides of said grid;
    each of said sockets connected to two of said tubular members by a pair of struts;
    each of said sockets supported above an upper surface of said struts by a pair of inclined mounting surfaces;
    a cross brace extending between each pair of said struts supporting each of said sockets adjacent intersections of said inclined mounting surfaces with said struts;
    a plurality of substantially uniformly spaced upstanding pins dimensioned for insertion into said sockets disposed in a line along two adjacent sides of said grid, said pins disposed on opposite sides of said grid with respect to said sockets such that a plurality of mats may be connected by inserting pins on one mat into sockets on another mat; and
    said pins extending substantially above said sockets such that said pins may be deformed after insertion into a socket to prevent displacement from said socket.

2. A mat for stabilizing particulate materials, comprising:
    a grid formed by a plurality of intersecting struts defining grid openings therebetween;
    a plurality of upstanding tubular members spaced on said grid;
    said grid and said tubular members integrally molded from a thermoplastic material; and
    each of said tubular members possessing substantially open top and bottom ends, whereby said tubular members may be filled with particulate material during installation of said mat while subsequently allowing water drainage through said tubular members.

3. The mat for stabilizing particulate materials of claim 2, wherein each of said tubular members overlies a strut intersection.

4. The mat for stabilizing particulate materials of claim 2, further comprising connecting means on said grid for connecting a plurality of mats in adjacent relation.

5. The mat for stabilizing particulate materials of claim 4, wherein said grid has a plurality of side edges and said connecting means comprises at least one first fastener on one of said side edges and at least one second fastener on another of said side edges such that a plurality of mats may be connected in adjacent relation.

6. The mat for stabilizing particulate materials of claim 5, wherein said first fastener comprises a pin and said second fastener comprises a socket.

7. The mat for stabilizing particulate materials of claim 6, wherein said pin extends substantially above said socket when received therein such that said pin may be deformed after insertion into said socket to prevent displacement from said socket.

8. The mat for stabilizing particulate materials of claim 5, wherein said mat is quadrilateral and includes a plurality of said first fasteners spaced along each of a first two adjacent side edges and a plurality of said second fasteners spaced along each of a second two adjacent side edges.

9. The mat for stabilizing particulate materials of claim 2, further comprising at least one sheet layer selected from the group consisting of geotextiles, geomembranes, or skeletal layers applied to a bottom surface of said mat.

10. The mat for stabilizing particulate materials of claim 2, further comprising at least one sheet layer selected from the group consisting of geotextiles, geomembranes, or skeletal layers applied to a top surface of said mat.

11. The mat for stabilizing particulate materials of claim 2, further comprising at least one sheet layer selected from the group consisting of geotextiles, geomembranes, or skeletal layers applied to top and bottom surfaces of said mat.

12. A mat for stabilizing particulate materials, comprising:
- a grid formed by a plurality of intersecting substantially perpendicular struts;
- a plurality of upstanding tubular members spaced uniformly on said grid;
- said tubular members having substantially open top and bottom ends whereby said tubular members may be filled with particulate material during installation of said mat while subsequently allowing water drainage through said tubular members;
- said tubular members each having a central longitudinal axis extending through an intersection of said struts forming said grid;
- said tubular members disposed in a substantially uniform rectangular array defined by a plurality of substantially perpendicular rows and columns; and
- each adjacent pair of said rows and each adjacent pair of said columns separated by a substantially parallel line formed by intersections of said struts forming said grid.

13. The mat for stabilizing particulate materials of claim 12, further comprising at least one sheet layer selected from the group consisting of geotextiles, geomembranes, or skeletal layers applied to a bottom surface of said mat.

14. The mat for stabilizing particulate materials of claim 12, further comprising at least one sheet layer selected from the group consisting of geotextiles, geomembranes, or skeletal layers applied to a top surface of said mat.

15. The mat for stabilizing particulate materials of claim 12, further comprising at least one sheet layer selected from the group consisting of geotextiles, geomembranes, or skeletal layers applied to top and bottom surfaces of said mat.

16. The mat for stabilizing particulate materials of claim 12, wherein said grid and said tubular members are integrally molded from a thermoplastic material.

17. The mat for stabilizing particulate materials of claim 12, wherein said grid has a plurality of side edges and said connecting means comprises at least one first fastener on one of said side edges and at least one second fastener on another of said side edges such that a plurality of mats may be connected in adjacent relation.

18. The mat for stabilizing particulate materials of claim 17, wherein said first fastener comprises a pin and said second fastener comprises a socket, said pin extending substantially above said socket when received therein such that said pin may be deformed after insertion into said socket to prevent displacement from said socket.

19. A mat for stabilizing particulate materials, comprising:
- a grid formed by a plurality of intersecting struts;
- a plurality of upstanding tubular members spaced on said grid;
- at least one longitudinal rib extending along a sidewall of each of said tubular members and intersecting one of said struts; and
- connecting means on said grid for connecting a plurality of mats in adjacent relation.

20. A mat for stabilizing particulate materials, comprising:
- a grid formed by a plurality of intersecting struts defining grid openings therebetween, said grid including a plurality of side edges;
- at least one pin on one of said side edges and at least one socket on another of said side edges, said at least one pin and said at least one socket forming connecting means such that a plurality of mats may be connected in adjacent relation;
- a plurality of upstanding tubular members spaced on said grid; and
- each of said tubular members possessing substantially open top and bottom ends, whereby said tubular members may be filled with particulate material during installation of said mat while subsequently allowing water drainage through said tubular members.

21. A mat for stabilizing particulate materials, comprising:
- a grid formed by a plurality of intersecting struts defining grid openings therebetween;
- a plurality of upstanding tubular members spaced on said grid;
- each of said tubular members possessing substantially open top and bottom ends, whereby said tubular members may be filled with particulate material during installation of said mat while subsequently allowing water drainage through said tubular members; and
- at least one sheet layer selected from the group consisting of geotextiles, geomembranes, or skeletal layers applied to top and bottom surfaces of said mat.

* * * * *